Oct. 16, 1945.  E. H. BROWN  2,386,928
LINE MEASURING AND CUTTING MACHINE
Filed Oct. 28, 1943   3 Sheets-Sheet 1
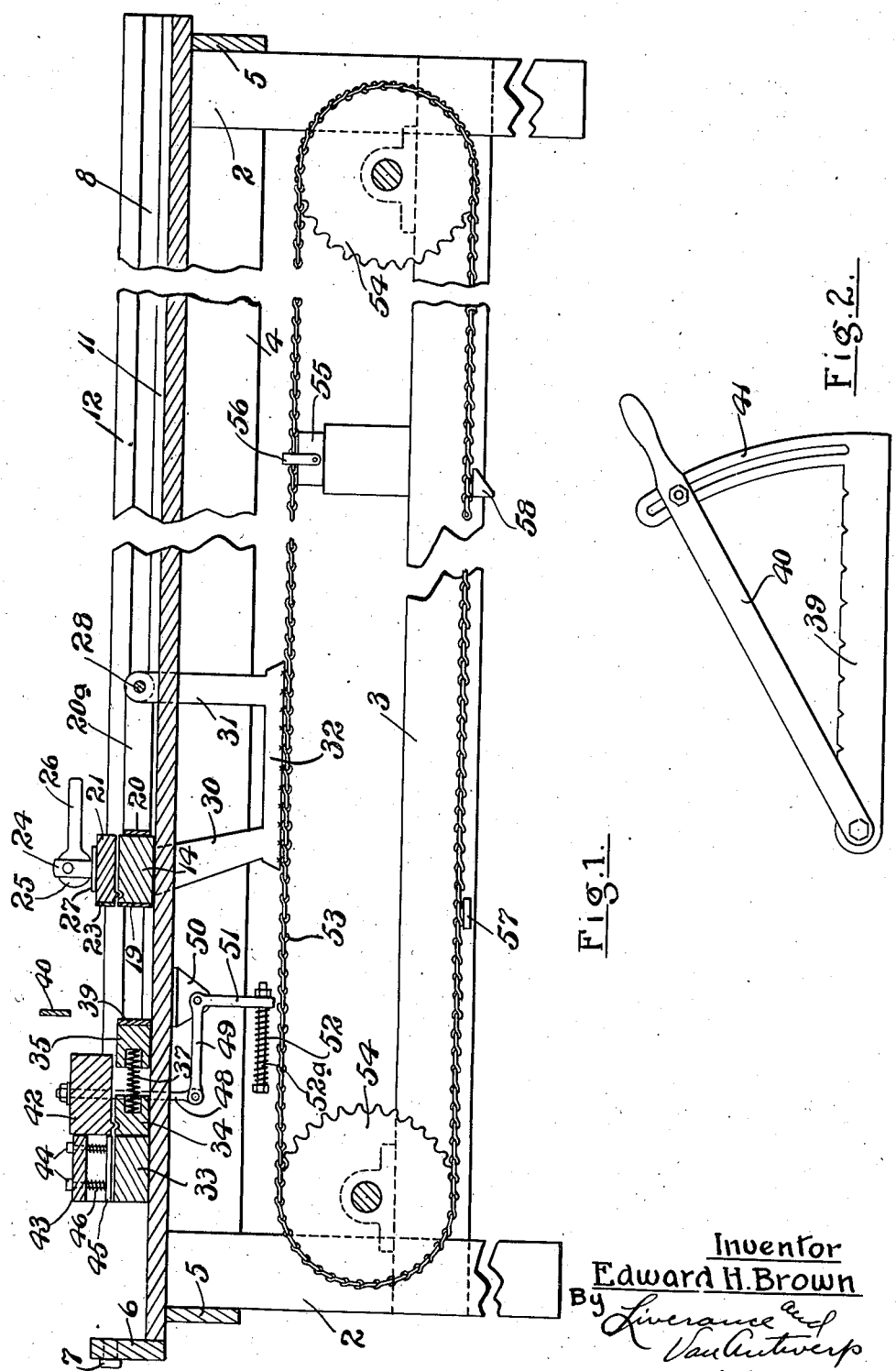
Inventor
Edward H. Brown
By Liverance and
Van Antwerp
Attorneys

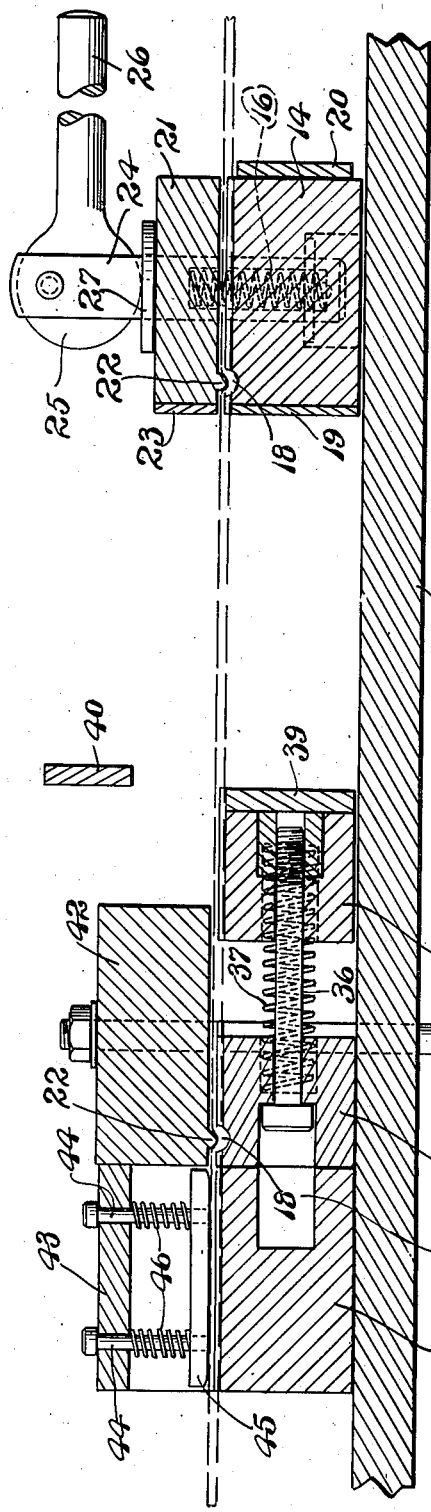
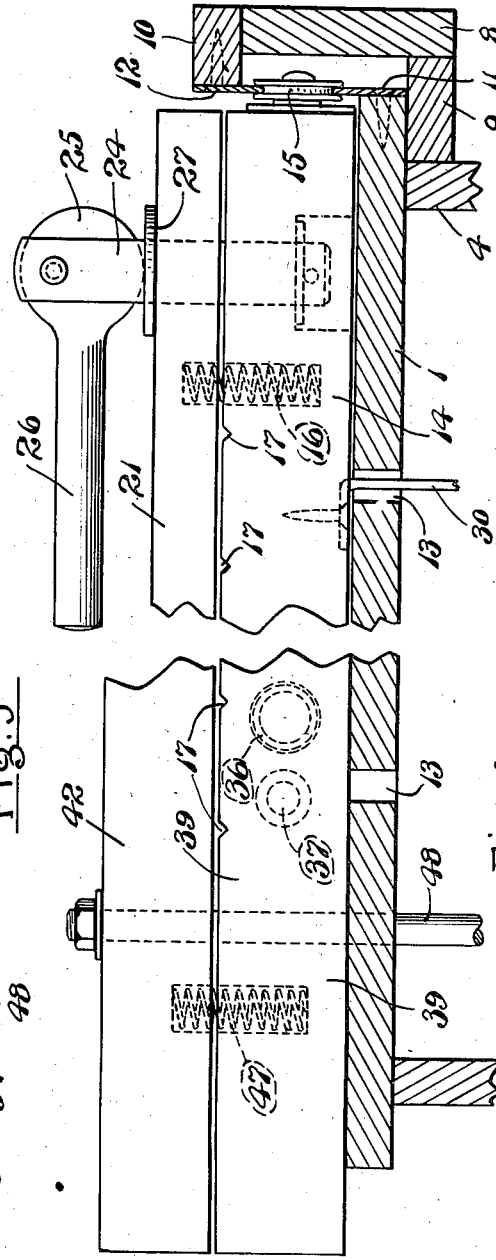

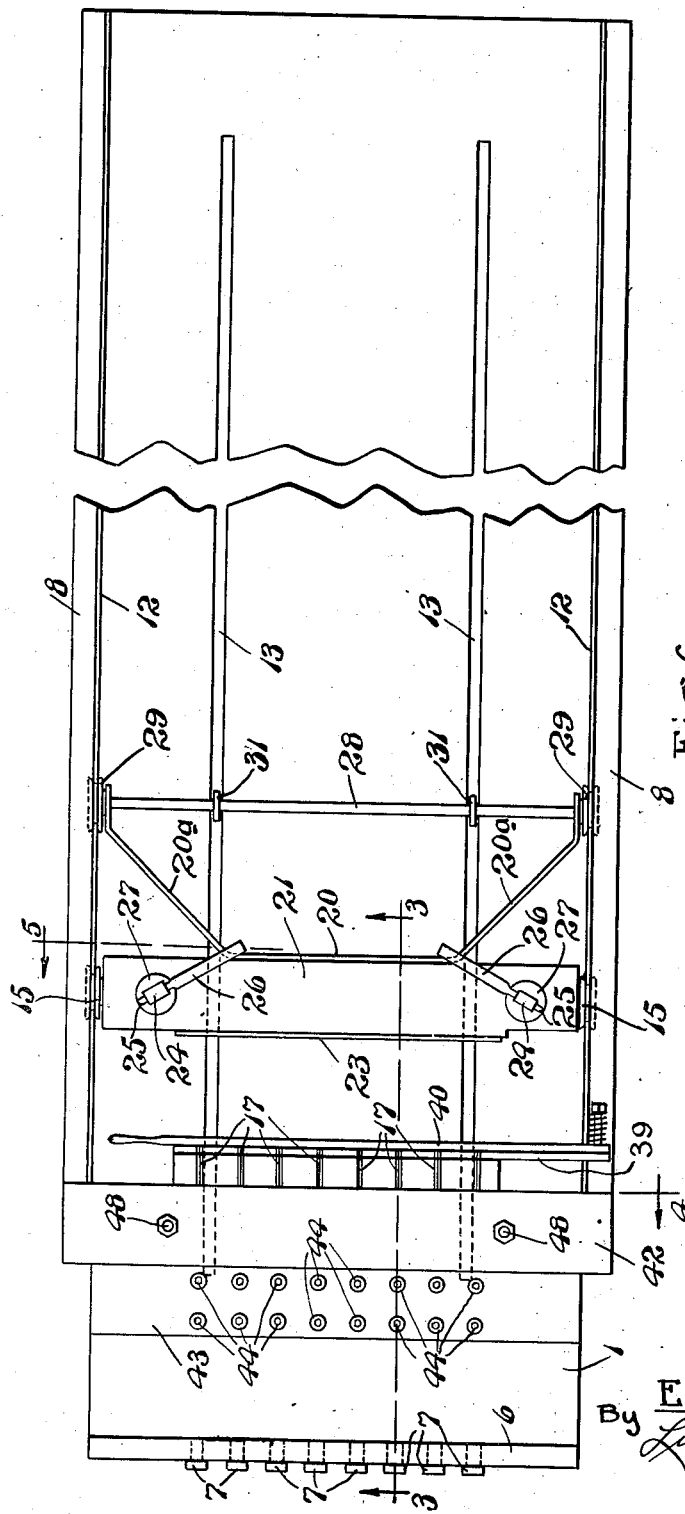

Patented Oct. 16, 1945

2,386,928

UNITED STATES PATENT OFFICE 2,386,928

LINE MEASURING AND CUTTING MACHINE

Edward H. Brown, Grand Rapids, Mich., assignor to McInerney Spring & Wire Company, Grand Rapids, Mich., a corporation of Michigan Application October 28, 1943, Serial No. 508,073

15 Claims. (Cl. 164—42)

The present invention relates to a machine for rapidly measuring and cutting lines or cords. Specifically, the present machine has been built for the rapid quantity production of shroud lines for parachutes which carry bombs downwardly after they have been dropped from an airplane flying at a relatively low level, so that the airplane may be beyond the area affected by the explosion of the bomb when it reaches the target.

In accordance with specifications for such lines or cords they must be of a specified length under a predetermined tension which in connection with the machine which has been built is at five pounds for each line. Previously the manner of cutting such lines was to draw them out the desired distance and place them under tension by use of a weight of the amount required and measure them to the distance which the line should have in length under such conditions and cut them off while under the tension provided by the weight. Also in the length of the lines while under tension they are to be marked at predetermined spaced distances in the length of the lines, this to guide the parachute maker in points of attachment to the parachute shroud. Such one-at-a-time production of the lines is slow and relatively expensive.

With the present machine a plurality of the lines are accurately measured under the requisite tension, marked at the desired places and cut while under such tension, the lines removed and the operation quickly repeated, producing the lines in greatly increased quantities and with a consequent reduction, particularly in labor cost, of the expense previously necessary.

For an understanding of a preferred form of machine embodying my invention, reference may be had to the following description, taken in connection with the accompanying drawings, in which, Fig. 1 is a longitudinal vertical section through a machine embodying the invention.

Fig. 2 is an elevation of a cutting knife for cutting the plurality of lines while under the required tension and drawn to the proper places to attain the specified lengths thereof.

Fig. 3 is a fragmentary enlarged vertical section longitudinally of the machine substantially on the plane of line 3—3 of Fig. 6, looking in the direction indicated.

Fig. 4 is a fragmentary transverse vertical section and elevation substantially at the plane indicated at 4 in Fig. 6 looking in the direction indicated.

Fig. 5 is a similar section substantially at the plane of the line 5—5 of Fig. 6, and Fig. 6 is a plan view of the machine.

Like reference characters refer to like parts in the different figures of the drawings.

In the construction of the machine a horizontal table 1 of the required length is supported by corner and other vertical posts 2 with horizontal rails 3 connecting and reinforcing the posts and with longitudinal apron members 4 and cross apron members 5 at the upper ends of the posts and underneath the table 1 as shown. At the entrance end of the machine a vertical transverse bar 6 is secured through which a plurality of sleeve guides 7 extend through each of which a line or cord is passed. At each side of the table 1 a vertical side member 8 (Fig. 5) is located and is connected adjacent its lower edge to a horizontal filler bar 9 which extends under the adjacent edge of the table 1 and is secured thereto and to the adjacent apron 4. At the upper end of the side member 8 a horizontal bar 10 is secured extending inwardly beyond the inner side thereof. Vertical tracks 11 and 12 of flat metal spaced from each other at their adjacent edges are secured at the side edges of the table 1 and at the inner edges of the bars 10, lying in the same vertical planes. The table 1 between its sides has elongated slots 13 spaced from each other and extending from a short distance back of what may be termed the front or entrance end of the machine nearly to the rear end thereof. Two of such slots are shown (Fig. 6) but the number may be increased if desired.

A line pulling carriage is mounted for movement over the table 1, including a lower bar 14 rectangular in cross section which at each end is equipped with a grooved roller 15 engaging the tracks at 11 and 12 (Fig. 5). The bar 14 carries a plurality of coiled compression springs 16 in recesses in its upper side which receive the lower end portions of the springs. Also the bar at its upper side has a plurality of transverse V-shaped guide grooves 17, one for each of the lines or cords which is to be entered into the machine; and longitudinally of the bar 14 near its front side and in its upper side a groove 18 is made (Fig. 3). At the front side of the bar 14 a flat metal plate 19 is secured and at the rear side a plate 20 is likewise secured at the intermediate portion of the length of the bar, its ends being bent outwardly and rearwardly as at 20a for a purpose hereafter described.

Over the bar 14 a second bar 21 of less vertical height is located and is carried by the springs 16 which normally lift the bar 21 a short distance above the lower bar 14. The upper bar 21 at its front portion and at its lower side is provided with a longitudinal bead 22 directly over the longitudinal groove 18 (Fig. 3). The front side of the bar 21 also has a flat metal plate 23 attached.

Stirrups 24 of flat metal extend through the bar 21 and are connected at their lower ends to the bar 14 one adjacent each end of said bars. A cam 25 having a substantially circular outline is eccentrically mounted on and between the sides of each of the stirrups 24 and provided with a handle 26. A bearing plate 27 is located below each eccentric 25 on the bar 21. It is apparent that on turning the handles 26 to the position shown in Figs. 3 and 5, the bar 21 is forced downwardly against the lifting springs 16 and that any lines or cords located in the V-shaped groove 17 will be clamped between the two bars 14 and 20, the bead 22 pressing them into the groove at 18. In Fig. 3 a cord or line is indicated in dash lines. On turning the handle 26 to upper position the lines will be released, the springs 16 elevating the upper bar 21 a sufficient distance.

The outward and rearward arms 20a of the plate 20 secured at the back of the bar 14 have their extremities turned into parallelism with the tracks 11 and 12. A horizontal shaft 28 passes through the end portions of the arms 20a and at its ends carries rollers 29, identical with the rollers 15, and likewise traversing the tracks 11 and 12.

The carriage thus constructed has frames, one for each of the longitudinal slots 13 in the table 1, connected thereto including the arms 30, 31 and 32 secured at the lower side of the bar 14 the arms 31 being carried by the shaft 28. Said arms (Fig. 1) extend downwardly through the slots 13 and are integrally connected at their lower ends by a horizontal member 32 to the underside of which, as later appearing, an endless chain is permanently secured by welding or equivalent connection.

A short distance back of the lines entrance guide bar 6, a bar 33 rectangular in cross section is secured across the table, back of which is a second bar 34 having V-shaped transverse grooves 17 in their upper sides, the bar 34 being provided with a longitudinal groove 18 like that in the bar 14. At the rear of the bar 34 is a second bar 35 of the same height, with similar grooves 17 in its upper side, which is normally forced to the rear by coiled springs 37 between it and the bar 34. Bar 35 is limited in its rearward movement by headed rods 36, the heads thereof being adapted to traverse recesses 38 in the rear side of the bar 33 and the front side of the bar 34. A metal plate 39 is fixed at the back of the bar 35. A cutting knife 40 may be pivotally connected at one end to an end of the bar 39 for severing all of the lines transversely at one time and may be held in an upper position by connection with an upwardly curved slotted finger 41 (Fig. 2) as indicated.

A bar 42 of greater width than bar 34 is disposed over bar 34, with the front sides of said bars 42 and 34 in the same vertical plane, ahead of and connected to which bar 42 is an additional bar 43 in the under side of which a plurality of transverse slots are made one over each of the line receiving grooves 17 in the bar 33. Headed rods 44 in pairs pass downwardly through the bar 43 at each of said slots (Fig. 3), each pair of rods 44 at its lower end having connection to a presser bar 45 which is forced in a downward direction by coiled springs 46 around the rods 44 until the heads of said rods engage against the upper side of the bar 43. Each of the bars 45 is located directly over a line guide 17 in the bar 33 and normally will bear with a relatively light pressure against any line being drawn therethrough to maintain the line against sagging and in a lightly taut condition when it is being drawn to the rear, as will later be described. The bar 42 is normally held in an upper position by coiled compression springs 47, similar to the springs 16, so that the lines may normally move freely between said bars 42 and 34; but when the upper bar is drawn in a downward direction, a longitudinal rib 22 at its under side directly over the longitudinal groove 18 in the upper side of the bar 34 will engage with and pinch or clamp all of the lines into said groove 18, clamping the lines against further drawing.

Vertical rods 48 pass through and are connected at their upper end portions to the bar 42, passing downwardly through the table 1. In the machine shown there are two of these rods and each at its lower end is connected to a horizontal arm 49 of a bell crank lever pivotally mounted on a bracket 50 below the table (Fig. 1). The other and vertical arm 51 of the bell crank lever extends downwardly from the pivot and at its lower end carries a headed rod 52a which passes freely through the lower end of the arm 51 and has a nut at its rear end, a coiled spring 52 around the headed rod between the head on the rod and the arm 51 normally positioning the parts in the position shown in Fig. 1.

Endless chains 53, two in number or one for each of the slots 13, are carried around wheels 54 mounted on horizontal shafts which may be supported on the frame rails 3. To the upper runs of the chains the lower bars 32 of the downwardly extending frames connected with the previously described carriage are welded or otherwise permanently secured. An electric switch at 55 is provided with an operating arm 56 which extends upwardly at one side of the upper run of a chain. On the lower run of said chain blocks 57 and 58 are welded or otherwise permanently secured at properly spaced intervals the block 57 being thinner than the block 58 and extending to one side of the chain sufficiently to engage a switch arm 56 when the chain brings it to that position.

In operation, assuming that a plurality of lines or cords have been passed through the guides at 7, thence underneath the pressure tensioning bars at 45 and between the bars 42 and 34 and over the bar 35 and their ends inserted between the bars 21 and 14, the upper bar 21 is forced in a downward direction by operating the cams 25 by their handles 26 to securely clamp the lines between the lower and upper bars 14 and 21. The chains 53 are then started in operation to carry the upper run thereof to the rear. This moves the carriage rearwardly over the table which movement continues with the members 32 passing the switch lever 56 until the block 57 passes under the arm 51 and engages against the switch lever 56, turning it to cut off current to a reversible electric motor which drives the chains through connection to one of the shafts on which the wheels 54 are mounted. The bar at 42 will be in its elevated position under the influence of the springs 47 during such drawing and pulling of the lines which lines will be held in a lightly taut condition by pressure of the tension members 45.

Shortly before the switch arm at 56 is operated to break the electric circuit in which the driving motor is located, block 58 engages against the head of the rod 52a compressing the spring 52 until it has compressed sufficiently that its force overcomes the lifting force of the springs 47, whereupon the bar 42 is moved downwardly into clamping position against the lines to clamp them between it and its lower bar 34. This stops any further movement of the lines through the guides at 7. But for a short time thereafter the carriage to which the free ends of the lines are clampingly connected will continue its movement thereby placing the lines under tension. By careful experiment and test the distance of movement of the carriage after the drawing of the lines into the machine has been stopped is gauged so that when the switch at 55 is operated to stop any further movement of the carriage, said lines will under the predetermined required tension which they must have, and at which their lengths will be that specified for the particular shroud lines which the machine shown is to accurately measure while under such tension.

While in this condition the lines may be marked at their spaced apart points at places which may be indicated on the side rails 8 and thereupon severed by the cutting knife 40, or in any other suitable manner.

For a repeat of the process described, the reversible motor which drives the chains 53 is reversed by manual control in its operation, whereupon the carriage is moved back until the plate 19 on bar 14 comes against the plate 39 on bar 5 compressing the springs 37 and moving the bar 35 under the overhang of the bar 42.

The bar 21 having been previously released to move to its upper position to release the previously measured lines will permit the forwardly projecting ends of the lines beyond the bar 42 to insert themselves between the bars 14 and 21 as they move rearwardly against the plate 39 and compressing the springs 37 where said ends may be gripped in the grooves 17 by compressing the bar 21 by means of the eccentrics 25.

The motor is thereupon stopped preferably by a suitable automatic turning of a switch breaking the circuit of the motor similar to block 57 engaging lever 56, the rear free ends of the line clamped in position, and the motor started in the opposite direction to draw the lines under light tension to their required length with an application of the requisite pull thereon, five pounds for each line in the machine which has been built, and an automatic stopping of the machine when such lines have been pulled out the proper distance and are under the requisite tension.

With the machine as constructed an evident great increase in quantity production of parachute or shroud lines of proper specified length measures under the tension required by the specifications is readily produced, greatly economizing the production of such lines. The construction is one of a durable nature and with no parts or arrangements of parts liable to get out of order. It has been built and practically used and is very successful in operation. A disclosure of the electric circuit for controlling the motor outside of the automatic stopping when the travel of the line drawing and pulling carriage has reached its proper position at the rear of the table is not shown as such control is not of a particularly novel character and is readily attained by a competent electrician. It is apparent that the stopping of the carriage at its foremost position may be attained in the same manner as when it has reached its rearmost position.

The invention is defined in the appended claims. All variations and employment of equivalents for elements recited in said claims are to be considered as comprehended by my invention.

I claim:

1. In a construction of the class described, a support, means mounted thereon for releasable connection thereto of the end of a line or cord, means for moving said last mentioned means over the support to pull the line in the direction of its length, means for automatically stopping such movement at a predetermined position of said first mentioned means on the support, and means for automatically stopping movement of the line a short time before stopping said line drawing means, to thereby place the line under a predetermined tension when the line drawing means reaches its stopped position.

2. A construction containing the elements in combination defined in claim 1, and means for maintaining the line lightly taut while it is being pulled.

3. A construction containing the elements in combination defined in claim 1, combined with means for severing the line while under such tension, said line being accessible in the length thereof between its drawing means and the place of severing whereby it may be marked at predetermined points in its length while under tension.

4. In a construction of the class described, a horizontal table, a carriage movable lengthwise of said table, means on said carriage for releasably securing the ends of a plurality of lines or cords to be drawn over the table on movement of the carriage in one direction, guide and clamping means through which the lines are drawn, means for moving said carriage to draw the lines over the table, means operated by said last mentioned means for clamping the lines and stopping their inward movement while the carriage is moving, and means for automatically stopping the carriage from movement at a predetermined position a short distance beyond the position which the carriage occupies when the lines are clamped against movement, whereby the lines are subjected to a predetermined tension and are stretched the distance that the carriage moves after the lines have been clamped.

5. In a construction of the class described, a horizontal table, a carriage located transversely of the table, tracks at the side of the table to support the carriage for movement longitudinally thereover, said carriage including a lower transverse bar and an upper bar adapted to be moved in a downward direction to securely clamp the ends of a plurality of lines between said upper and lower bars, means through which the lines are drawn on movement of the carriage over the table acting on each of said lines to maintain it in a light taut condition, clamping means normally ineffective through which the lines are drawn on movement of the carriage away therefrom, means for moving the carriage away from said clamping means to draw the lines therethrough, means automatically actuated by said carriage means for rendering said clamping means effective upon the carriage reaching a predetermined position on the table, and means for automatically stopping movement of said carriage and its moving means upon further movement of the carriage a predetermined distance, whereby the lines are stretched under a predetermined tension to a predetermined length.

6. A construction containing the elements in combination defined in claim 5, and means for severing the lines while under such tension to provide a plurality of individual lines all of predetermined length under predetermined tension.

7. In a construction of the class described, a horizontal table having longitudinal slots therein, a carriage mounted to move lengthwise of the table over said slots, releasable clamping means on the carriage for releasably connecting the ends of a plurality of lines thereto, chains mounted lengthwise of the table underneath said slots, connections between said carriage and chains, said chains being adapted to be moved longitudinally to thereby move the carriage lengthwise of the table, stationary clamping means on the table through which the lines are drawn when the carriage is moved over the table away therefrom, means normally rendering said clamping means ineffective, means on the chains engaging with cooperating means connected with said clamping means for operating said clamping means to engage the lines and hold them from movement, a switch control and means on said chains for automatically operating said switch control to stop the chains in movement a short time after said clamping means has been rendered effective.

8. In a construction of the class described, an elongated horizontal table, a carriage mounted for movement thereover, said carriage including a lower bar transversely of the table and an upper bar located over the lower bar, yielding means between said bars normally elevating the upper bar, manually operable means for forcing the upper bar in a downward direction, entrance guide means for lines at an end of the table, a stationary clamping means disposed between said entrance guide means and the carriage including a lower bar transverse of and secured to the table and a second bar located over the first bar, spring means between said bars normally lifting said second bar to an upper position, rods connected to said upper bar extending downwardly through the table, bell cranks to one arm of which said rods are connected, the other arms of the bell cranks extending downwardly, means movable underneath and longitudinally of the table, connections between said means and the carriage, said table having longitudinal slots for passage of said connections, and means on said movable means for operating the downwardly extending arms of said bell crank levers to move the upper bar of said clamping means in a downward direction, as and for the purposes specified.

9. In a construction of the class described, a horizontal elongated table, a carriage mounted on said table for movements lengthwise thereof, said carriage including a lower transverse bar and a second bar thereover, means for normally lifting the second bar above the first bar, manually operable means for moving said second bar downwardly against said lifting means and for releasing it, said carriage bars being adapted to have the ends of a plurality of lines inserted and thereafter releasably secured between them, a transverse bar secured to and across the table at its upper side, a second transverse bar between the last mentioned bar and said carriage, spring means normally forcing the last mentioned bar toward the carriage, an upper bar located over said fixed transverse bar, spring means normally elevating said upper bar, said lines being adapted to pass between the fixed bar and upper bar and over said movable bar, means to which the carriage is connected for moving it over the table in a direction to draw the lines with it over the table and for returning the carriage to bring the lower bar thereof against said movable bar and move it toward said fixed transverse bar whereby lines, the end portions of which lie over said movable bar are inserted between the upper and lower carriage bars in position for releasable connection therebetween.

10. In a construction of the class described, a horizontal table, guides for a plurality of lines at one end of the table, a carriage mounted for movement longitudinally of the table, means for releasably connecting the lines at their ends to said carriage whereby the lines are drawn over the table on movement of the carriage away from said guides, a clamping means through which all of the lines pass located between the guides and said carriage, means normally rendering said clamping means ineffective, means for automatically operating said clamping means to engage the lines and stop drawing movement thereof upon the carriage reaching a predetermined position over the table, and means for stopping the carriage from movement a short time after the movement of said lines has been stopped to thereby stretch the lines between the carriage and said clamping means and place them under tension.

11. In a construction of the class described, a support, means mounted thereon for releasable connection thereto of the end of a line or cord, means for moving said last mentioned means over the support to pull the line in the direction of its length, means for automatically stopping such movement at a predetermined position of said first mentioned means on the support, means for automatically stopping movement of the line a short time before stopping said line drawing means to place the line at a predetermined tension when the line drawing means reaches its stopped position, and means whereby when said first mentioned means is returned over the support, after removal of the line which has been drawn and tensioned thereby, it automatically receives a succeeding line for releasable connection thereto.

12. In a construction of the class described, a horizontal table, a carriage mounted thereon for movement lengthwise of the table, releasable clamping means on the carriage for connecting the end of a line or cord thereto to be pulled in the direction of its length, means for moving the carriage, means for automatically stopping carriage movement at a predetermined position thereof over the table, means for automatically stopping movement of the line a short time before stopping the carriage to place the line under a predetermined tension, said line being adapted to be severed and released from the carriage, and means against which the carriage engages and which is moved by the carriage on returning the carriage in the opposite direction to a predetermined position for the automatic entrance of the end of a succeeding line into position with respect to the carriage to be clamped thereby, to be drawn in the direction of its length and tensioned, as described.

13. In a machine of the class described an elongated frame, a head mounted to traverse said frame longitudinally, means for clamping a line on said head, a guide block over which said line passes, said guide block having a limited movement longitudinally of said frame, yieldable means for thrusting said guide block toward said head and means mounted on said head for cutting said line.

14. The elements of claim 13 combined with means for clamping said line against said guide block.

15. The elements of claim 13 combined with means through which said line passes for exerting frictional resistance to movement of said line located adjacent said guide block on the side opposite to head.

EDWARD H. BROWN.